US010048147B2

(12) United States Patent
Saitoh et al.

(10) Patent No.: US 10,048,147 B2
(45) Date of Patent: Aug. 14, 2018

(54) PRESSURE SENSOR INCLUDING A THIN-FILM DIAPHRAGM PROVIDED WITH PLURAL RESISTIVE BODIES PRINTED IN A STRAIGHT LINE AND MANUFACTURING METHOD THEREFOR

(71) Applicant: SMC CORPORATION, Chiyoda-ku (JP)

(72) Inventors: Mitsuhiro Saitoh, Koshigaya (JP); Yuta Oshima, Moriya (JP); Takeshi Yamagishi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/179,232

(22) Filed: Jun. 10, 2016

(65) Prior Publication Data
US 2017/0082512 A1 Mar. 23, 2017

(30) Foreign Application Priority Data

Sep. 18, 2015 (JP) .................................. 2015-185686

(51) Int. Cl.
*G01L 9/00* (2006.01)
*G05D 23/12* (2006.01)

(52) U.S. Cl.
CPC .......... *G01L 9/0044* (2013.01); *G01L 9/0051* (2013.01); *G01L 9/0052* (2013.01); *G05D 23/122* (2013.01)

(58) Field of Classification Search
None
See application file for complete search history.

(56) References Cited

U.S. PATENT DOCUMENTS

| 4,894,635 | A | 1/1990 | Yajima et al. |
| 6,761,073 | B2 | 7/2004 | Otobe et al. |
| 9,638,589 | B2* | 5/2017 | Fiori ....................... G01L 25/00 |
| 2002/0053603 | A1 | 5/2002 | Bernini |
| 2007/0151356 | A1* | 7/2007 | Sumigawa ............... G01B 7/16 73/777 |
| 2015/0075289 | A1 | 3/2015 | Cogilati et al. |
| 2015/0128713 | A1* | 5/2015 | Kakoiyama ........... G01L 9/0052 73/721 |
| 2017/0082512 | A1 | 3/2017 | Saitoh et al. |
| 2017/0082513 | A1* | 3/2017 | Saitoh ................... G01L 9/0051 |

(Continued)

FOREIGN PATENT DOCUMENTS

| EP | 2 175 252 B1 | 9/2013 |
| JP | 60-152949 U | 10/1985 |
| JP | 61-96347 U | 6/1986 |

(Continued)

OTHER PUBLICATIONS

U.S. Appl. No. 15/149,163, filed Jun. 10, 2016, Mitsuhiro Saitoh, et al.

(Continued)

*Primary Examiner* — Andre Allen
(74) *Attorney, Agent, or Firm* — Oblon, McClelland, Maier & Neustadt, L.L.P.

(57) ABSTRACT

A pressure sensor includes a ceramic sensor that is accommodated between a body and a holder. On an end surface of the sensor, plural resistive bodies are printed and fired in a straight line using a thick-film resistive paste material by screen printing.

4 Claims, 4 Drawing Sheets

(56) References Cited

U.S. PATENT DOCUMENTS

2018/0038753 A1    2/2018   May et al.

FOREIGN PATENT DOCUMENTS

| JP | 63-293432 A | 11/1988 |
|---|---|---|
| JP | 3-19940 U | 2/1991 |
| JP | 2000-292283 | 10/2000 |
| JP | 2009-85931 | 4/2009 |

OTHER PUBLICATIONS

Office Action dated Jan. 23, 2018 in Japanese Patent Application No. 2015-185684 (with unedited computer generated English translation), 4 pages.

Office Action dated Jan. 23, 2018 in Japanese Patent Application No. 2015-185686 (with unedited computer generated English translation), 6 pages.

Office Action issued in corresponding Japanese Application No. 2015-185686 dated Apr. 3, 2018 in (with English translation), 7 pages.

Notice of Allowance and Fees Due dated May 8, 2018 for U.S. Appl. No. 15/179,163.

Japanese Office Action dated Jun. 12, 2018 for Japanese Patent Application 2015-185686, and English translation thereof.

* cited by examiner

PRIOR ART

PRESSURE SENSOR INCLUDING A THIN-FILM DIAPHRAGM PROVIDED WITH PLURAL RESISTIVE BODIES PRINTED IN A STRAIGHT LINE AND MANUFACTURING METHOD THEREFOR

CROSS-REFERENCE TO RELATED APPLICATION

This application is based upon and claims the benefit of priority from Japanese Patent Application No. 2015-185686 filed on Sep. 18, 2015, the contents of which are incorporated herein by reference.

BACKGROUND OF THE INVENTION

Field of the Invention

The present invention relates to a pressure sensor, which detects the pressure of a pressure fluid that flows inside a fluid passage, as well as a manufacturing method therefor.

Description of the Related Art

Heretofore, on a manufacturing line in which water, oil, and a chemical solution or the like are used, a pressure sensor has been used for the purpose of measuring the pressure of such fluids. The pressure sensor, for example, as disclosed in European Patent No. 2175252, includes a ceramic sensor on which plural resistive bodies are disposed on a surface thereof, and in a state in which the sensor is accommodated in the interior of a body, the resistive bodies undergo deformation responsive to the pressure of a pressure fluid which is introduced into the interior of the body through a port, and the pressure is detected from an output voltage corresponding to the deformation. The resistive bodies are formed, for example, by being printed so as to be arranged in a substantially rhombic shape with respect to the surface of the sensor by thick-film printing such as screen printing or the like and being thereafter fired.

SUMMARY OF THE INVENTION

However, with the above-described pressure sensor, since the plural resistive bodies are arranged in a substantially rhombic shape, when the resistive bodies are printed by a paste material using a screen mask during screen printing, due to their arrangement, the resistive bodies cannot be printed simultaneously, and small deviations in the printing timing tend to occur.

As a result, due to such deviations in the printing timing of the resistive bodies, differences in the printing conditions of the respective resistive bodies occur, and the thickness of the resistive bodies becomes non-uniform. As result, variations occur in the resistance values of the respective resistive bodies, and consequently an operation to adjust the resistance values thereof becomes complex, thus leading to a decrease in productivity.

A general object of the present invention is to provide a pressure sensor, in which a plurality of resistive bodies can be produced easily and uniformly, whereby product quality and ease of manufacturing can be enhanced, and also to provide a manufacturing method for such a pressure sensor.

The present invention is characterized by a pressure sensor including a body including a fluid passage into which a pressure fluid is introduced, and a ceramic sensor disposed on an end of the body and including a thin-film diaphragm portion that faces toward the fluid passage, wherein, on the diaphragm portion, plural resistive bodies, which are printed by thick-film printing, are provided in a straight line and are separated mutually at a predetermined distance from each other.

According to the present invention, in the pressure sensor having a ceramic sensor disposed on an end of the body, on the thin-film diaphragm portion of the ceramic sensor, the plural resistive bodies, which are printed by thick-film printing, are provided in a straight line and are separated mutually at a predetermined distance from each other.

Consequently, when the plural resistive bodies are printed by thick-film printing, since the resistive bodies can all be printed simultaneously, the printing conditions and the film thickness are made uniform. Thus, product quality can be improved, while at the same time, since an adjustment operation for the resistive bodies can be rendered unnecessary, ease of manufacturing also is enhanced.

Further, the present invention is characterized by a manufacturing method for manufacturing a pressure sensor including a ceramic sensor, the method including the steps of:

after carrying out surface processing with respect to the sensor, printing and firing wires with respect to an end surface of the sensor by thick-film printing using a conductive paste material; and by scraping a thick-film resistive paste material of a ruthenium base with respect to a screen mask, simultaneously printing and firing plural resistive bodies in a straight line by thick-film printing in a direction perpendicular to a direction of the scraping of the thick-film resistive paste material.

According to the present invention, after printing and firing of the wires with respect to the end surface of the sensor by thick-film printing using a conductive paste material, the plural resistive bodies are printed and fired with respect to the end surface of the sensor in a straight line by thick-film printing in a direction perpendicular to the scraping direction of the thick-film resistive paste material.

Consequently, since the plural resistive bodies can be simultaneously printed with respect to the sensor by the thick-film resistive paste material, the printing conditions and the film thickness can be made uniform, and along therewith, it is also possible for the resistance values in the respective resistive bodies to be made uniform. As a result, an operation to adjust the resistance values of the resistive bodies is rendered unnecessary, and while improving ease of assembly, a pressure sensor of high product quality can be obtained.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
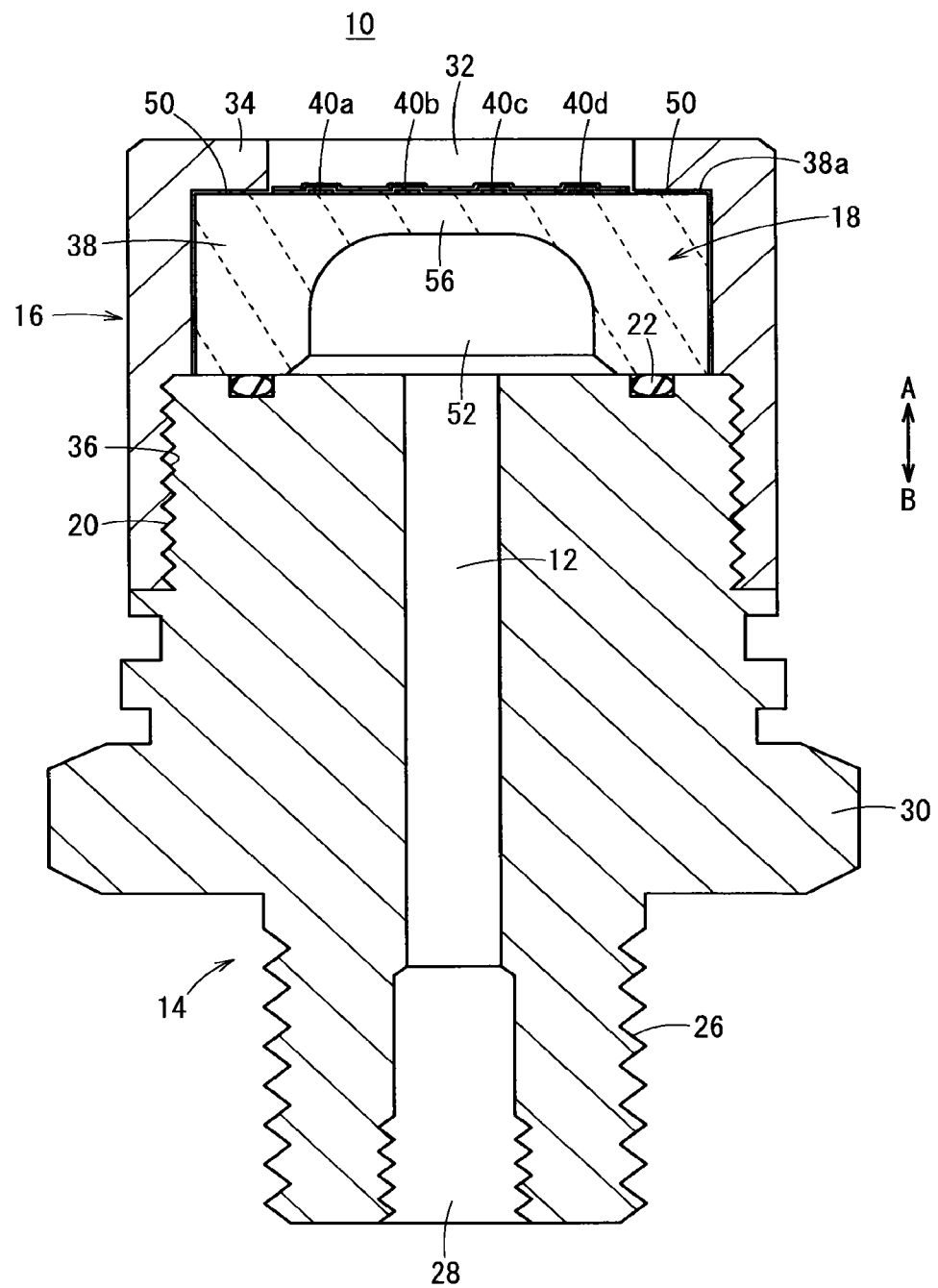
FIG. 1 is an overall cross-sectional view of a pressure sensor according to an embodiment of the present invention.

As shown in FIG. 1, a pressure sensor 10 includes a body 14 having a fluid passage 12 into which a pressure fluid is introduced, a holder 16 mounted on one end of the body 14, and a sensor 18 that is disposed in the interior of the holder 16 between the holder 16 and the body 14.

The body 14, for example, is formed from a metal material, with a first screw section 20 being disposed on an outer circumferential surface of one end thereof that is formed with a circular shape in cross section. A holder 16, which will be described later, is connected integrally with the body 14 by screw-engagement. Further, a sealing ring 22 is disposed through an annular groove on an end surface of the one end, and abuts against a lower surface of the sensor 18 described below. The sealing ring 22 may be either annular or rectangular insofar as it is of a ring shape.

Further, positioning pins 24 (see FIG. 3) are disposed on the one end of the body 14, which project at a predetermined height in a direction (the direction of the arrow A) away from the one end, and are inserted into later-described grooves 54 of the sensor 18.

On the other hand, similar to the one end side, a second screw section 26 is formed on an outer circumferential surface on another end of the body 14. The second screw section 26 is connected by screw-engagement, for example, to a port of a non-illustrated fluid pressure device, and a fluid introduction port 28, which opens in an end surface of the other end, is formed in the center of the other end. In addition, the fluid introduction port 28 is formed along an axial direction (the direction of arrows A and B) in the center of the body 14, and communicates with the fluid passage 12 that penetrates to the one end of the body 14.

Furthermore, a cross-sectional hexagonally shaped nut section 30 is formed on the outer circumferential surface of a substantially central portion of the body 14 along the axial direction (the directions of arrows A and B). By gripping the nut section 30 with a non-illustrated tool and rotating the body 14, the body 14 is connected through the second screw section 26 to a non-illustrated fluid pressure device or the like.

The holder 16, for example, is formed in a bottomed cylindrical shape from a metal material such as brass or stainless steel, etc., and in the center of one end on the bottom thereof, an opening 32 is formed that penetrates in the axial direction (the direction of arrows A and B). In addition, a pressing portion 34 is formed on an outer circumferential portion of the opening 32. Further, on an inner circumferential surface of the other end side (in the direction of the arrow B) in the holder 16, an internally-threaded portion 36 is provided that is screw-engaged with the first screw section 20 of the body 14. In addition, the holder 16 is connected coaxially by screw-engagement through the internally-threaded portion 36 so as to cover the one end of the body 14.

Figure 2:
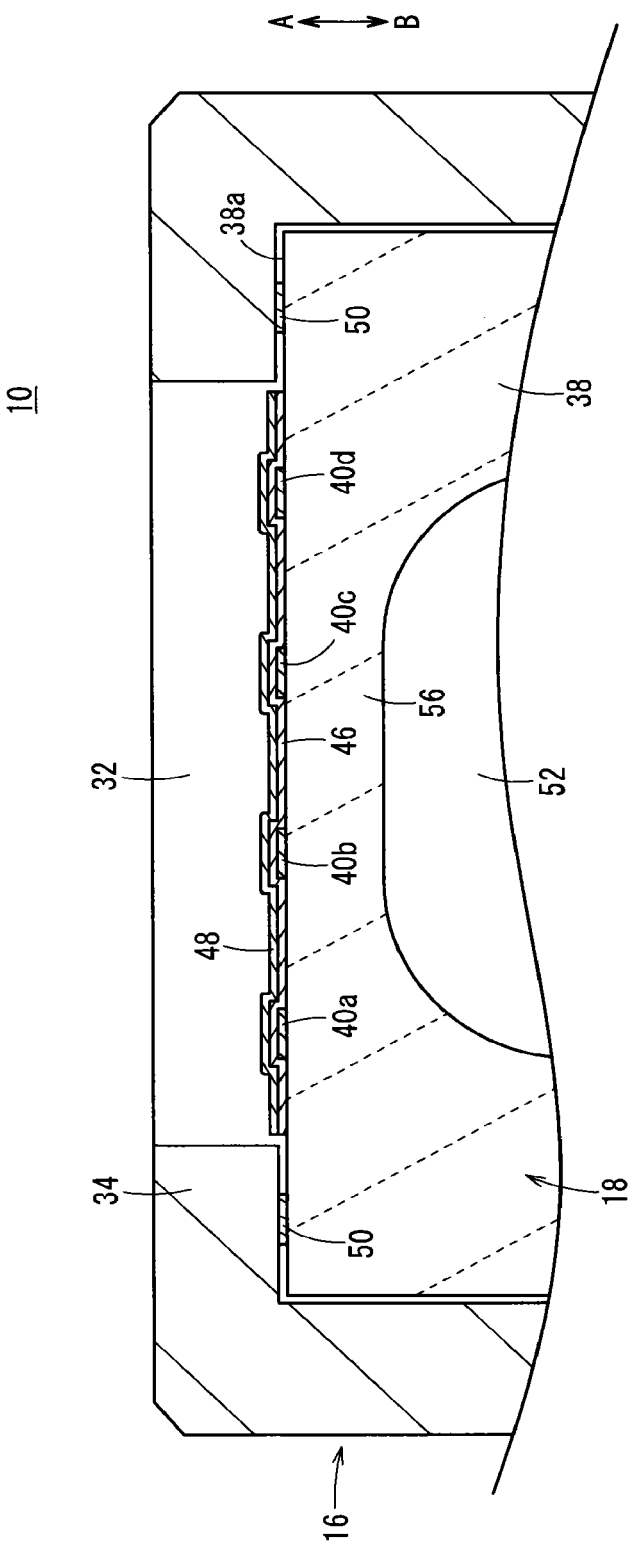
FIG. 2 is an enlarged cross-sectional view showing the vicinity of a sensor of the pressure sensor shown in FIG. 1.
Figure 3:
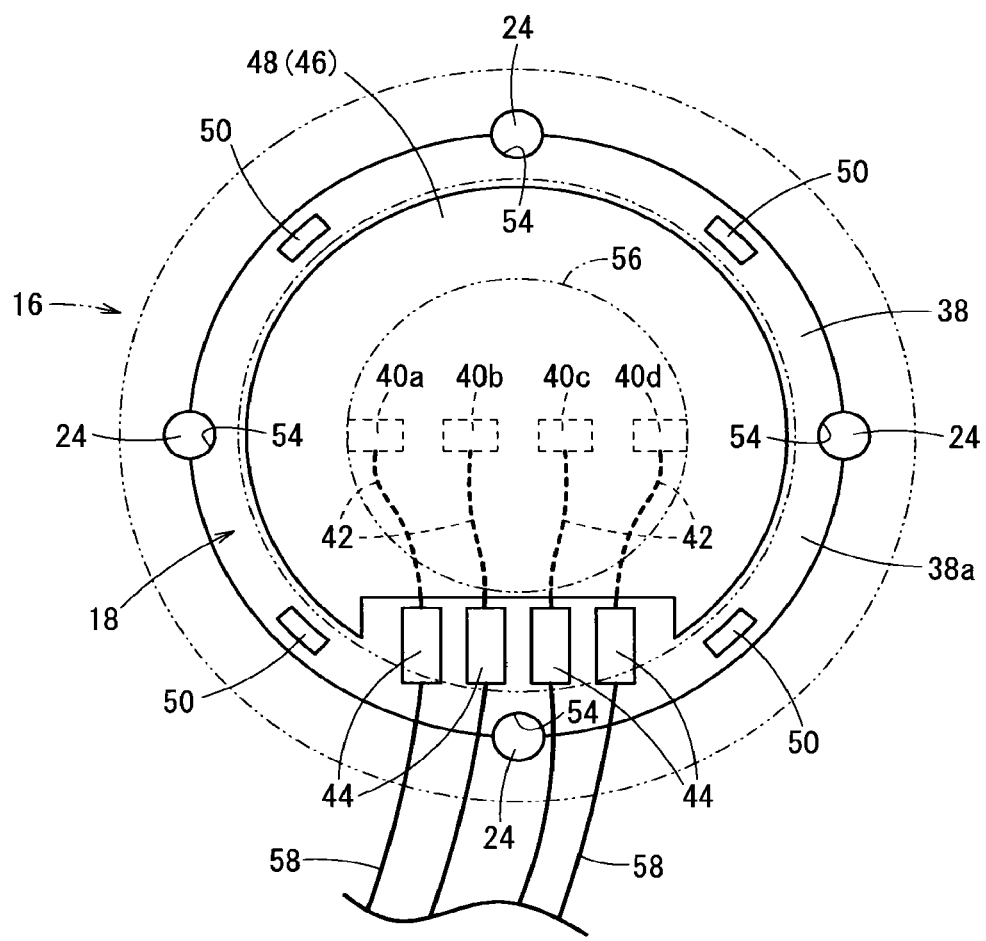
FIG. 3 is a front view of the sensor in the pressure sensor shown in FIG. 1.

As shown in FIGS. 1 through 3, the sensor 18 is formed from a ceramic material such as aluminum oxide ($Al_2O_3$, alumina) or the like. The sensor 18 is made up from a base body 38 that is U-shaped in cross section including a concavity 52 substantially in a center region thereof, plural resistive bodies 40a through 40d that are mounted on an end surface 38a of the base body 38, electrodes 44 connected through wires 42 to the resistive bodies 40a through 40d, first and second protective films 46, 48 that cover the resistive bodies 40a through 40d as a double-layered structure, and a plurality of protrusions 50 that project out from the end surface 38a.

In addition, in a state in which the concavity 52 is arranged so as to face the fluid passage 12 on the side of the body 14 (in the direction of the arrow B), the sensor 18 is accommodated and held between the holder 16 and the body 14.

On an outer circumferential surface of the base body 38, as shown in FIG. 3, for example, multiple grooves 54 are formed, which are recessed radially inward with semicircular shapes in cross section, and extend along the axial direction (the direction of arrows A and B). In addition, when the sensor 18 is assembled onto the one end of the body 14, the positioning pins 24 are inserted respectively into the grooves 54, whereby the sensor 18 is positioned in the circumferential direction. Stated otherwise, rotation of the sensor 18 with respect to the body 14 is restricted.

On the other hand, in a substantially central portion of the base body 38, a substantially circular diaphragm portion 56 having a predetermined thickness is provided on the side of the end surface 38a (in the direction of the arrow A) on an opposite side from the concavity 52. The diaphragm portion 56 is formed more thinly than an outer circumferential region of the base body 38, and a plurality of resistive bodies 40a through 40d, which function as a strain gauge, are disposed on the surface of the diaphragm portion 56. The resistive bodies 40a through 40d are formed by printing and firing, for example, using a thick-film printing technique such as screen printing or the like. The resistive bodies 40a through 40d are arranged in a straight line and are separated mutually at a predetermined distance from each other.

Moreover, the resistive bodies 40a through 40d are formed by firing a thick-film resistive paste material of a ruthenium (Ru) base, for example.

Further, as shown in FIG. 3, the wires 42 that are connected to the resistive bodies 40a through 40d, and the electrodes 44 are fired after being printed using a conductive paste material, and the wires 42 are connected respectively to the electrodes 44, which are disposed on an outer edge portion of the base body 38.

As shown in FIG. 2, the first protective film 46 is disposed with respect to the end surface 38a of the base body 38 so as to cover the resistive bodies 40a through 40d, and is formed by printing and firing a low-melting-point glass. Owing thereto, the resistive bodies 40a through 40d are protected, and the moisture-proof and insulative properties thereof are ensured.

The second protective film 48 is disposed so as to cover the first protective film 46, and is formed by printing and firing an organic material such as an epoxy resin, a phenol resin, or the like.

Further, as shown in FIGS. 2 and 3, the plural protrusions 50 are provided on the end surface 38a of the base body 38, and project at predetermined heights from the end surface 38a at positions on the outer side in the radial direction of the diaphragm portion 56. The protrusions 50, for example, are formed with rectangular shapes in cross section, at a height of about 20 to 40 µm with respect to the diaphragm portion 56, and are formed from the same material as the resistive bodies 40a through 40d. Further, preferably, the protrusions 50 should be formed by printing and firing the same material as the resistive bodies 40a through 40d at the same height as the resistive bodies simultaneously when the resistive bodies 40a through 40d are printed.

The protrusions 50 are provided in a plurality (for example, four) at respective equal angular distances mutually about the center of the base body 38. The positions (angular positions) of the protrusions 50 are set such that, in the case that the holder 16 is screw-engaged and fastened with respect to the body 14, when a load (fastening load) is applied in a vertical direction (the direction of the arrow B) from the holder 16 to the end surface of the sensor 18, the resistive bodies 40a through 40d disposed on the diaphragm portion 56 are less likely to undergo distortion due to the load. Furthermore, preferably, the protrusions 50 are disposed at positions separated radially outward as much as possible with respect to the diaphragm portion 56.

Herein, a case is described in which the protrusions 50 are disposed at four locations that are offset (shifted) by about 45° in the circumferential direction with respect to the respective grooves 54 in the base body 38.

In addition, when the holder 16 and the body 14 are fastened together in a state in which the sensor 18 is accommodated in the interior of the holder 16, the sensor 18 is fixed in a condition where the pressing portion 34 of the holder 16 is placed in abutment against the protrusions 50 of the sensor 18 and a fastening load that is applied in a vertical direction (axial direction) is applied to the protrusions 50.

Further, the above-described first and second protective films 46, 48 may be formed so as to cover the protrusions 50 also.

The pressure sensor 10 according to the embodiment of the present invention is constructed basically as described above. Next, a manufacturing method for the sensor 18 including the resistive bodies 40a through 40d will be described.

First, surface processing is effected by carrying out cleaning, baking, etc., with respect to the base body 38, which is made up from a ceramic material such as aluminum oxide or the like.

Next, after printing of the wires 42 by screen printing or the like using a conductive paste material including, for example, Au, Ag, Pd, Ni, Cu, or the like with respect to the end surface 38a of the aforementioned base body 38, the wires 42 are subjected to binding by firing.

Next, a thick-film resistive paste material of a ruthenium (Ru) base is placed on a non-illustrated screen mask, and by scraping the resistive paste material linearly (the direction of the arrow C in FIG. 4A) with a squeegee (not shown), the resistive bodies 40a through 40d are printed by the thick-film resistive paste material, which is transferred from a print pattern.

Figure 4A:
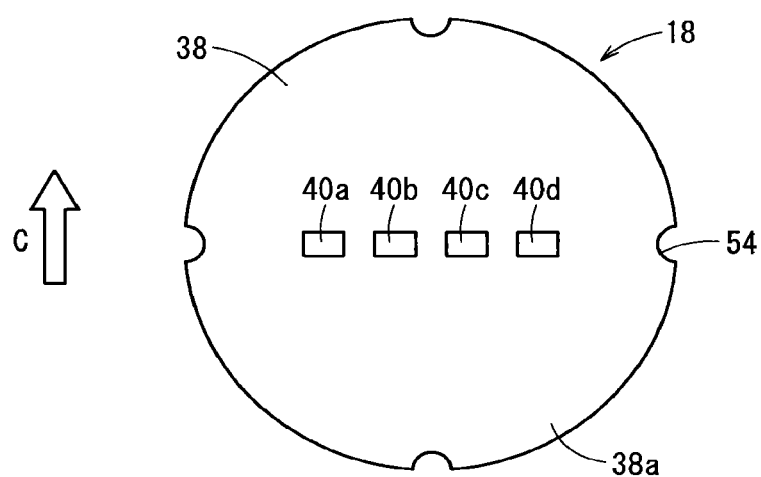
FIG. 4A is a front view of the sensor in which an arrangement of resistive bodies in FIG. 3 is shown.

At this time, as shown in FIG. 4A, the direction (direction of the arrow C) in which the thick-film resistive paste material is scraped by the non-illustrated squeegee is a direction that is perpendicular to a row of the resistive bodies 40a through 40d that are arranged side by side in a straight line.

Therefore, the plural resistive bodies 40a through 40d are printed simultaneously on the end surface 38a of the base body 38 by using the thick-film resistive paste material through the print pattern that is formed on the screen mask.

Figure 4B:
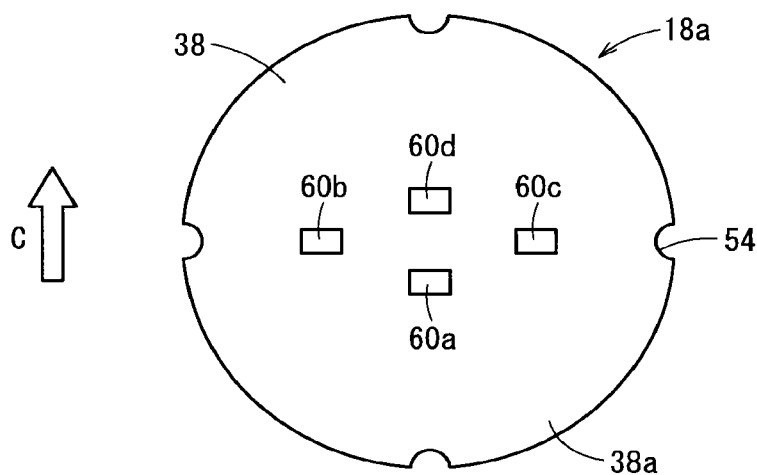
FIG. 4B is a front view of a sensor in which an arrangement of resistive bodies according to a conventional technique is shown.

Stated otherwise, in the case that the plural resistive bodies 60a through 60d, for example, are arranged in a substantially rhombic pattern, and are not arranged in a straight line, as in the sensor 18a according to the conventional technique shown in FIG. 4B, when the thick-film resistive paste material is scraped, for example, in the direction of the arrow C for printing, first, the resistive body 60a is printed, next, the resistive bodies 60b, 60c are printed simultaneously, and finally, the resistive body 60d is printed.

More specifically, when the plural resistive bodies 60a through 60d are printed, a time difference in the printing timing thereof occurs, and therefore, simultaneously with a difference in the printing conditions, a difference in the film thickness also occurs.

Next, by printing and firing a low-melting-point glass on the end surface 38a of the base body 38, the first protective film 46 is formed with respect to the end surface 38a so as to cover the resistive bodies 40a through 40d. Owing thereto, the resistive bodies 40a through 40d are protected, and simultaneously, the moisture-proof and insulative properties thereof are ensured.

In the case that printing variations occur in the aforementioned resistive bodies 40a through 40d, in order to adjust a variance in the resistance values, trimming of non-illustrated thick-film resistors for adjustment, which are connected in series or in parallel with the resistive bodies 40a through 40d, is carried out, for example, by a laser or the like.

Lastly, the second protective film 48 that is made up from an organic material such as an epoxy resin, a phenol resin, or the like, is printed and fired so as to cover the first protective film 46 for thereby carrying out protection of the trimming members, and manufacturing of the sensor 18 is then completed.

The above-described first and second protective films 46, 48 may be formed so as to cover only the resistive bodies 40a through 40d, or may be disposed up to the vicinity of an outer edge portion of the sensor 18 so as to cover the plurality of protrusions 50 in addition to the resistive bodies.

Next, operations of the pressure sensor 10, in which the sensor 18 is assembled in the foregoing manner, will briefly be described. Moreover, in this description, the pressure sensor 10 is placed in a condition in which the other end of the body 14 is screw-engaged and attached to a port of a non-illustrated fluid pressure device.

A pressure fluid from the non-illustrated fluid pressure device is introduced into the fluid passage 12 through the fluid introduction port 28 of the body 14, the pressure fluid flows along the fluid passage 12 toward the side of the sensor 18 (in the direction of the arrow A), and by being introduced into the concavity 52, the diaphragm portion 56 is pressed and flexed (distorted) by the pressure of the pressure fluid.

Depending on the flexure (distortion) of the diaphragm portion, distortion of the resistive bodies 40a through 40d, which are disposed on the diaphragm portion 56, is caused, and the resistive bodies 40a through 40d convert the distortion into electric signals. Thereafter, the electric signals are output to the electrodes 44 through the wires 42. In addition, voltages are output to a non-illustrated measurement device or the like through respective lead wires 58 connected to the electrodes 44. The pressure of the pressure fluid based on the voltages is then measured.

In the foregoing manner, according to the present embodiment, by the plural resistive bodies 40a through 40d being arranged on the end surface 38a of the sensor 18 that makes up the pressure sensor 10 in a straight line by using the thick-film resistive paste material of a ruthenium (Ru) base, it is possible for the plural resistive bodies 40a through 40d to be printed simultaneously, for example, by screen printing.

As a result, even in the case that the plural resistive bodies 40a through 40d are provided, the printing conditions for the respective resistive bodies 40a through 40d can be made uniform, and the film thicknesses thereof also can be uniform. Thus, it is possible for the resistance values in the plural resistive bodies 40a through 40d to be made uniform. Further, the need for a trimming operation for the purpose of adjusting the resistance values of the resistive bodies 40*a* through 40*d* can be eliminated, and since the manufacturing time can easily be shortened, ease of manufacturing can be enhanced along with improving product quality.

The plural resistive bodies 40*a* through 40*d* are not necessarily limited to the case described above, in which the resistive bodies 40*a* through 40*d* are provided in a straight line as a single row. For example, it is possible for the resistive bodies 40*a* through 40*d* to be printed and formed simultaneously also in the case that they are arranged in two straight lines as two rows. Therefore, by making the printing conditions and the film thickness thereof uniform, the manufacturing time can further be shortened.

Further, since the resistance values of the plural resistive bodies 40*a* through 40*d* are uniform, for example, even in the event of changes in the ambient temperature, the resistance values of the respective resistive bodies 40*a* through 40*d* change in the same way, and thus the temperature characteristics thereof can behave favorably.

The pressure sensor and the manufacturing method thereof according to the present invention are not limited to the embodiments described above, and it is a matter of course that various structures or configurations may be adopted therein without deviating from the scope of the present invention as defined by the appended claims.

What is claimed is:

1. A pressure sensor comprising a body including a fluid passage into which a pressure fluid is introduced, and a ceramic sensor disposed on an end of the body and including a thin-film diaphragm portion that faces toward the fluid passage;

wherein, on the diaphragm portion, plural resistive bodies, which are printed by thick-film printing, are provided in a straight line and are separated mutually at a predetermined distance from each other.

2. The pressure sensor according to claim 1, wherein the resistive bodies are provided in at least one row or more.

3. A manufacturing method for manufacturing a pressure sensor including a ceramic sensor, comprising the steps of:

after carrying out surface processing with respect to the sensor, printing and firing wires with respect to an end surface of the sensor by thick-film printing using a conductive paste material; and by scraping a thick-film resistive paste material of a ruthenium base with respect to a screen mask, simultaneously printing and firing plural resistive bodies in a straight line by thick-film printing in a direction perpendicular to a direction of the scraping of the thick-film resistive paste material.

4. The manufacturing method according to claim 3, further comprising the steps of:

covering the resistive bodies with a first protective film made from a low-melting-point glass; and after resistance values of the resistive bodies have been adjusted, covering the first protective film with a second protective film made from an organic material.

* * * * *